(12) United States Patent  
Planning et al.

(10) Patent No.: US 7,400,911 B2  
(45) Date of Patent: Jul. 15, 2008

(54) WIRELESS NODE AND METHOD OF POWERING A WIRELESS NODE EMPLOYING AMBIENT LIGHT TO CHARGE AN ENERGY STORE

(75) Inventors: Matthew F. Planning, Milwaukee, WI (US); Charles J. Luebke, Sussex, WI (US); Marco Naeve, Milwaukee, WI (US)

(73) Assignee: Eaton Corporation, Cleveland, OH (US)

( * ) Notice: Subject to any disclaimer, the term of this patent is extended or adjusted under 35 U.S.C. 154(b) by 498 days.

(21) Appl. No.: 11/046,916

(22) Filed: Jan. 31, 2005

(65) Prior Publication Data

US 2006/0172782 A1    Aug. 3, 2006

(51) Int. Cl.  
*H04B 1/38* (2006.01)  
*H04M 1/00* (2006.01)

(52) U.S. Cl. .................. 455/572; 455/573; 455/127.1; 455/343.1; 320/101; 320/124; 320/128

(58) Field of Classification Search ......... 455/572–574, 455/127.1, 127.5, 343.1–343.5; 320/101, 320/124, 125, 128, 134, 166, 167; 340/545.3, 340/636.2, 7.23–7.38, 539.26  
See application file for complete search history.

(56) References Cited

U.S. PATENT DOCUMENTS

| | | | |
|---|---|---|---|
| 5,883,577 A | 3/1999 | Jordan et al. | |
| 6,114,830 A * | 9/2000 | Luo | 320/101 |
| 6,289,237 B1 * | 9/2001 | Mickle et al. | 600/509 |
| 6,340,864 B1 | 1/2002 | Wacyk | |
| 6,448,489 B2 * | 9/2002 | Kimura et al. | 136/244 |
| 6,466,826 B1 * | 10/2002 | Nishihira et al. | 700/17 |
| 6,570,386 B2 * | 5/2003 | Goldstein | 324/415 |
| 6,791,458 B2 * | 9/2004 | Baldwin | 340/522 |
| 6,882,128 B1 * | 4/2005 | Rahmel et al. | 320/101 |
| 7,155,317 B1 * | 12/2006 | Tran | 700/259 |
| 7,230,531 B2 * | 6/2007 | Vronay | 340/539.2 |
| 2003/0231001 A1 * | 12/2003 | Bruning | 320/108 |
| 2005/0146220 A1 * | 7/2005 | Hamel et al. | 307/44 |
| 2006/0037380 A1 * | 2/2006 | Bulst et al. | 73/29.01 |
| 2006/0043336 A1 * | 3/2006 | van Schoor | 252/301.36 |
| 2006/0099980 A1 * | 5/2006 | Nielsen et al. | 455/507 |
| 2006/0164206 A1 * | 7/2006 | Buckingham et al. | 340/5.6 |

\* cited by examiner

*Primary Examiner*—Simon D Nguyen  
(74) *Attorney, Agent, or Firm*—Martin J. Moran

(57) ABSTRACT

A wireless node, such as a sensor node or other suitable node, includes a supercapacitor having a charge and one or more photocells adapted to charge the supercapacitor responsive to ambient light. A microprocessor cooperates with a wireless transceiver to transmit a count of one or more wireless messages. The microprocessor determines the charge of the supercapacitor, determines an incremental charge of the supercapacitor resulting from the ambient light, and adjusts the count of the wireless messages as a function of the charge of the supercapacitor and the incremental charge. A power supply, including a boost regulator and a filter capacitor, powers the microprocessor and the wireless transmitter from the charge of the supercapacitor.

21 Claims, 3 Drawing Sheets

WIRELESS NODE AND METHOD OF POWERING A WIRELESS NODE EMPLOYING AMBIENT LIGHT TO CHARGE AN ENERGY STORE

BACKGROUND OF THE INVENTION

1. Field of the Invention

This invention pertains generally to wireless communication and, more particularly, to wireless nodes employing an energy store for power. The invention also pertains to methods of powering wireless nodes and, more particularly, of charging an energy store responsive to ambient light.

2. Background Information

Relatively low power, radio frequency (RF) lighting control systems employ wall-mounted, battery powered, RF switch "sensors". Such a switch sensor sends a signal to a remote power control device, such as relay, in order to turn one or more lights on and off. Since the switch sensors are battery powered, the batteries must either be manually replaced or else must be recharged from a suitable power source.

Unlike stand-alone devices, a low power, RF sensor device allows its sensor to be connected to a remote controller or monitor.

It is known to provide a sensor system in which a plurality of sensors are connected, either directly with wires or indirectly with RF communications, to a central control and monitoring device. An example of such a sensor system is a security system, which may include a telephone line for dial out/in communication.

U.S. Pat. No. 5,883,577 discloses a smoke detection unit including a solar cell array and first and second trickle charger/voltage regulator adjustable units. Power from the solar cell array is gained from light sources in the home or factory. The solar cell array provides up to 9 volts to the smoke detector unit via the first trickle charger with ambient light.

U.S. Pat. No. 6,340,864 discloses a wireless remote sensor employing low-power CMOS circuit techniques. Since the power requirements are so low, the sensor can maintain operation via a power source using only electromagnetic radiation, i.e., "free" power, which emanates from ambient energy sources. The sensor may receive "free" power from ambient energy sources and also includes a battery backup. In this embodiment, the power source provides power to the sensor to operate using the "free" power and/or the battery supplied power. This allows the sensor to conserve the battery energy level by using the "free" power when possible.

It is known to employ a wide range of electronic devices that are solar powered for outdoor use.

It is known to power a hand-held calculator by collecting and storing power derived from artificial indoor light.

There is room for improvement in wireless nodes and in methods of powering wireless nodes employing ambient light to charge an energy store.

SUMMARY OF THE INVENTION

These needs and others are met by the present invention, which provides a photocell to capture ambient light and convert it to electricity to power a wireless node (e.g., without limitation, a sensor node, such as, for example, a motion sensor; a photosensor; a wall switch) or to replenish an energy store, such as a battery or a "supercap".

In accordance with one aspect of the invention, a method of powering a wireless node adapted to transmit wireless messages comprises: employing an energy store including a charge; charging the energy store responsive to ambient light; determining an incremental charge of the energy store resulting from the ambient light; employing a charge removed from the energy store to transmit one of the wireless messages; determining the charge of the energy store; and adjusting a count of at least one of the wireless messages to be transmitted or a transmission rate of the wireless messages as a function of the incremental charge of the energy store, the charge of the energy store and the charge removed.

The method may further comprise determining the incremental charge added to the energy store during the charging; determining quiescent charge removed from the energy store; determining charge available for transmitting at least one of the wireless messages by the wireless node from the incremental charge plus the charge of the energy store less the quiescent charge; employing a predetermined charge removed as the charge removed; employing the charge available being greater than the predetermined charge removed as the function to determine a count of one wireless message as the count of at least one of the wireless messages to be transmitted; and transmitting the one wireless message.

The method may employ a sensor node as the wireless node; employ two wireless messages as the at least one of the wireless messages; and employ a second one of the two wireless messages to indicate that the sensor node is going to sleep.

The method may further comprise determining the incremental charge added to the energy store during the charging; determining quiescent charge removed from the energy store; determining charge available for transmitting at least one of the wireless messages by the wireless node from the incremental charge plus the charge of the energy store less the quiescent charge; employing a predetermined charge removed as the charge removed; and employing the charge available divided by the predetermined charge removed as the function to determine the count of at least one of the wireless messages to be transmitted over a predetermined time.

The method may employ a motion sensor node as the wireless node; periodically sense motion responsive to the ambient light; transmit one of the wireless messages to another wireless node to switch a light off responsive to no motion being detected after a first predetermined time; continue to periodically sense motion for a second predetermined time after the light is switched off; and transmit one of the wireless messages to the another wireless node to switch the light on responsive to motion being detected, and otherwise, sleep and wake up responsive to the ambient light.

The method may select the second predetermined time as a function of the charge of the energy store.

The method may further comprise determining that the charge of the energy store is below a predetermined value; and transmitting one of the wireless messages to another wireless node to turn on a light, in order to provide ambient light to charge the energy store.

The method may establish an inactive charge time and an active transmit time; determine the incremental charge added to the energy store during the inactive charge time; determine quiescent charge removed from the energy store during the active transmit time; determine charge available for transmitting one of the wireless messages from the incremental charge plus the charge of the energy store less the quiescent charge; employ a predetermined charge removed as the charge removed during the active transmit time for transmitting one of the wireless messages; and employ the charge available divided by the predetermined charge removed as the function to adjust the count of at least one of the wireless messages to be transmitted or the transmission rate of the wireless messages.

As another aspect of the invention, a wireless node comprises: an energy store including a charge; at least one photocell adapted to charge the energy store responsive to ambient light; a wireless transmitter; a processor cooperating with the wireless transmitter to transmit a count of at least one wireless message, the processor being adapted to determine the charge of the energy store, determine an incremental charge of the energy store resulting from the ambient light, and adjust the count of at least one wireless message as a function of the charge of the energy store and the incremental charge; and a power supply adapted to power the processor and the wireless transmitter from the charge of the energy store.

The wireless node may be a sensor node, such as a photo sensor adapted to inform a lighting controller of an amount of light on a work surface.

The sensor node may be a light switch or a motion sensor.

As another aspect of the invention, a wireless node comprises: an energy store including a charge; at least one photocell adapted to source a current responsive to ambient light; a current to voltage converter adapted to charge the energy store responsive to the current; a wireless transmitter; a processor cooperating with the wireless transmitter to transmit a count of at least one wireless message, the processor being adapted to determine the charge of the energy store, determine an incremental charge of the energy store resulting from the ambient light, and adjust the count of at least one wireless message as a function of the charge of the energy store and the incremental charge; and a power supply adapted to power the processor and the wireless transmitter from the charge of the energy store.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
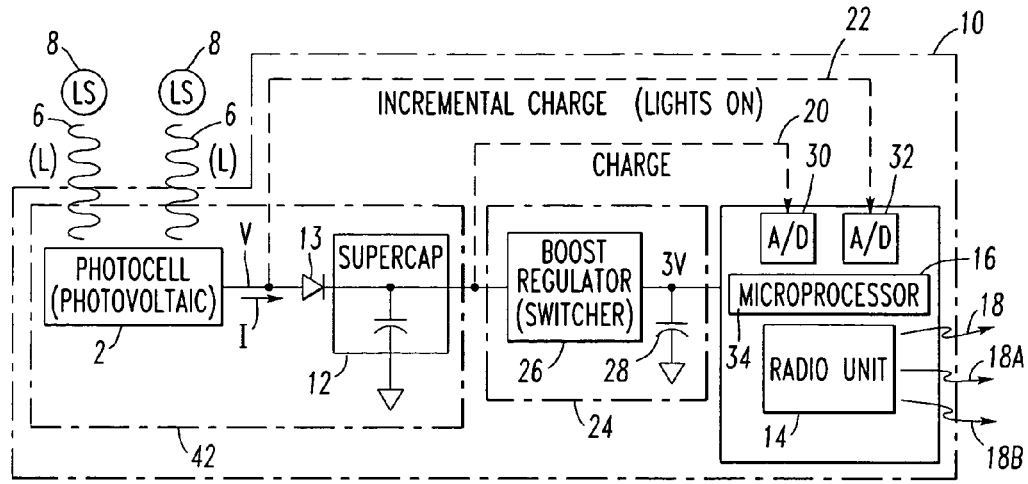
FIG. 1 is a block diagram in schematic form of a wireless node including a power circuit, a microprocessor and a radio unit in accordance with the present invention.

As employed herein, the term "ambient light" means light from artificial sources (e.g., one or more lights) and light from natural sources (e.g., the sun).

As employed herein, the terms "battery" or "storage battery" mean a cell or an electrically connected group of cells that converts chemical energy into electrical charge or energy by reversible chemical reactions and that may be recharged by passing a current through it in the direction opposite to that of its discharge.

As employed herein, the term "capacitor" or "supercap" or "supercapacitor" or "ultracapacitor" means a device typically consisting of conducting plates separated by thin layers of dielectric material. The plates on opposite sides of the dielectric material are oppositely charged and the electrical energy of the charged system is stored in the polarized dielectric.

As employed herein, the term "energy store" shall expressly include, but not be limited by, battery, storage battery, capacitor, supercap, supercapacitor, ultracapacitor and/or other devices for storing charge.

As employed herein, the term "photocell" means an electronic photosensitive device, such as one or more photoelectric cells or a light-to-electricity transducer, which is sensitive to varying levels of light, such as ambient light, to modify electrical properties or to generate or control an electric current or voltage.

As employed herein, the term "wireless" shall expressly include, but not be limited by, radio frequency (RF), infrared, wireless area networks, IEEE 802.11 (e.g., 802.11a; 802.11b; 802.11g), IEEE 802.15 (e.g., 802.15.1; 802.15.3, 802.15.4), other wireless communication standards, DECT, PWT, pager, PCS, Wi-Fi, Bluetooth™, and cellular.

As employed herein, the term "communication network" shall expressly include, but not be limited by, any local area network (LAN), wide area network (WAN), intranet, extranet, global communication network, the Internet, and/or wireless communication network.

As employed herein, the term "wireless message" shall expressly include, but not be limited by, any message, packet or information transmitted over a wireless communication network or wireless communication channel.

As employed herein, the term "network coordinator" (NC) shall expressly include, but not be limited by, any communicating device, which operates as the coordinator for devices wanting to join a communication network and/or as a central controller in a wireless communication network.

As employed herein, the term "network device" (ND) shall expressly include, but not be limited by, any communicating device (e.g., a portable wireless communicating device; a wireless node; a sensor node, such as, for example, a motion sensor or a wall switch; a control device node, such as, for example, a light fixture, a power control device or a relay; a camera/sensor device; a wireless camera; and/or devices or sensors, such as, switch sensors, motion sensors or temperature sensors as employed in a wirelessly enabled sensor network), which participates in a wireless communication network, and which is not a network coordinator.

As employed herein, the term "node" includes NDs and NCs.

The present invention is described in association with sensors of a wireless communication network, although the invention is applicable to a wide range of wireless communication systems, wireless communication networks and/or wireless communicating nodes thereof.

EXAMPLE 1

Figure 2:
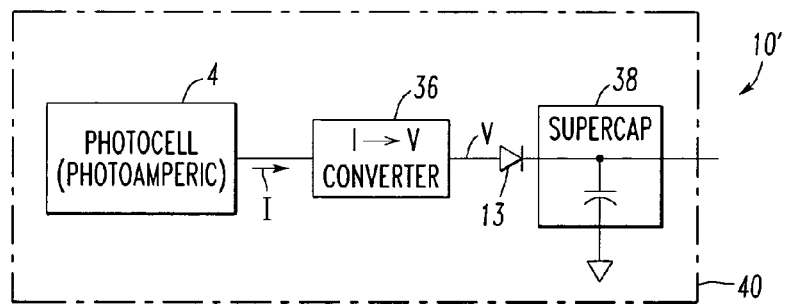
FIG. 2 is a block diagram in schematic form of another power circuit for a wireless node in accordance with another embodiment of the invention.

Referring to FIGS. 1 and 2, the power (P) output (voltage (V) times current (I)) of photocells 2,4 is dependent on the load. At a relatively high load impedance, the photocell 2 is photovoltaic (i.e., a voltage source) and at relatively low load impedance the photocell 4 is photoamperic (i.e., a current source). As a result, there is a preferred maximum power point (P=V*I) for operation. However, this point is affected by the amount of light impinging upon the photocells 2,4. For example, at 0.5 VDC per photocell, several of such cells (for convenience of illustration only one photocell 2 or 4 is shown in each of FIGS. 1 and 2) are stacked in series in order to provide a suitable output voltage (e.g., several volts).

EXAMPLE 2

FIG. 1 shows the photocell 2 (photovoltaic) that is impinged by light (L) 6 from one or more light sources 8 to output a voltage (V) and a current (I). A wireless node 10 includes an energy store, such as a supercap 12 having a charge, a diode 13 and one or more of the photocells 2 adapted to charge the supercap 12 through the diode 13 responsive to ambient light, such as the light 6.

The diode 13 between the photocell(s) 2 and the supercap 12 serves two purposes. First, the diode 13 prevents discharge when the photocell 12 is not providing charge to the supercap 12. Second, the diode 13 provides a relatively small voltage differential in the forward bias current direction to effectively measure current (charge) into the supercap 12, since the diode forward voltage does vary as a function of the diode forward current. Alternatively, the diode 13 may be replaced by a suitable MOSFET (not shown) having a current sensor output (not shown), in order to provide a relatively low forward voltage and a relatively more accurate current value, or by another suitable current sensing device (not shown). In this example, the MOSFET would be turned on responsive to a suitable voltage being output from the photocell(s) 2.

The wireless node 10 also includes a wireless transmitter, such as a radio unit 14, and a suitable processor, such as a microprocessor 16, cooperating with the radio unit 14 to transmit a count of at least one wireless message 18. As will be described, the microprocessor 16 is adapted to determine the charge 20 of the supercap 12, determine an incremental charge 22, which may be determined from the forward voltage of the diode 13, as provided by the photocell 2 resulting from the ambient light, and adjust the count of at least one wireless message 18 as a function of the charge 20 and the incremental charge 22. A power supply 24 including a boost regulator 26 and a filter capacitor 28 is adapted to power the microprocessor 16 and the radio unit 14 from the charge of the supercap 12.

The supercap 12 is electrically connected to the output of the photocell 2. The microprocessor 16 determines both the state of charge 20 of the supercap 12 and the incremental charge 22 thereof. For example, the state of charge 20 (e.g., $Q(t)=CV(t)$) may be determined by measuring the voltage of the supercap 12 via, for example, an analog-to-digital converter (A/D) 30. An average daily charge may be a calculated value (e.g., $\Delta Q(t)=CV(t1)-CV(t2)$; a running average). The incremental charge 22 (lights on) (e.g., $I(t)\Delta t=\Delta Q(t)$) may be determined with a suitable current sensor, such as the diode 13 or another suitable current sensor, through another A/D 32 (e.g., I is a function of the difference between the incremental charge 22 and the charge 20) or may be calculated based upon the capacitance and change of voltage of the supercap 12 (e.g., $I(t)\Delta t=\Delta Q(t)=C\Delta V(t)$) over a predetermined time ($\Delta t$).

If the load becomes a suitably high impedance when the supercap 12 is charged, then the photocell 2 delivers essentially no current and only creates a voltage potential. This is similar to a "smart" battery charger (not shown) that stops delivering current when a capacitor or battery (not shown) is fully charged.

As is discussed, below, in connection with Examples 5-7, the software 34 of the microprocessor 16 determines the incremental charge 22 (or average daily charging duration) and the state of charge 20 in the supercap 12, and knows the power consumption of the system under combinations of one or more conditions (e.g., quiescent; transmitting; receiving; sensing; not sensing; sleeping). In turn, the count of wireless messages 18 to be transmitted or the transmission rate of those wireless messages 18 is suitably adjusted according to the incremental charge 22 (e.g., resulting from the current ambient light) and the remaining charge 20 in the supercap 12.

For example, the microprocessor 16 either determines or is programmed with a predetermined value of the charge removed from the supercap 12 to transmit one of the wireless messages 18. The microprocessor 16 then determines or adjusts a count of the wireless messages 18 to be transmitted or a transmission rate of those wireless messages 18 as a function of the incremental charge 22, the charge 20 and the charge removed.

EXAMPLE 3

FIG. 2 shows the photocell 4 (photoamperic), a current to voltage (I/V) converter 36, and a supercap 38 as part of a circuit 40. The I/V converter 36 charges the supercap 38 responsive to the current (I) from the photocell 4. The circuit 40 is otherwise the same as the corresponding circuit 42 of FIG. 1 for the photocell 2 (photovoltaic). The downstream circuit (not shown in FIG. 2) is the same and also includes the microprocessor 16 and radio unit 14, the boost regulator 26 and the capacitor 28 of FIG. 1, and only the mode of operation changes. In either mode, the software 34 determines the state of charge 20 in order to know that there is sufficient power to perform, for example, sensing a sample input, analyzing the same, and transmitting the result. Also, the incremental charge 22 or charge rate is a second parameter which may be used to determine the allowed duty cycle (transmit interval) in order to maintain at least a suitable charge level in the supercap 38.

EXAMPLE 4

The wireless node 10 of FIG. 1, or the similar wireless node 10' of FIG. 2, is suitably sized to take in at least the needed power, and preferably more power than is expended over a certain time period (e.g., without limitation, a variable time depending upon transmission needs; a fixed time, such as 24 hours).

Equation 1 shows one such sizing model:

$$QR+QI=QQ+N\Delta QT \qquad \text{(Eq. 1)}$$

wherein:

$QR=C*VR$ is the charge (remaining) 20 in the supercap 12,38;

C is the capacitance of the supercap;

VR is the voltage (remaining) of the supercap;

$QI=C\Delta V$ is incremental charge added to supercap during inactive charge time (T1);

$\Delta V$ is incremental voltage of the supercap during the inactive charge time;

QQ is quiescent charge removed during active transmit time (T2);

$\Delta QT$ is transmit charge removed during the active transmit time per transmission;

N is a count of one or more wireless messages 18 during the active transmit time; and for example, T1+T2=24 hours.

Examples 5 and 7 show two different duty cycle models for operation.

EXAMPLE 5

In a "just in time" model, the wireless nodes 10,10' are sensor nodes that are sized to quickly charge up, in order that, for example, sensor data can be sent (e.g., one time) when required. Here, the sensor node knows, monitors and/or calculates QR+QI, until that sum is big enough to support the charge needed by one transmission, i.e., QQ+ΔQT.

For example, such a sensor node would likely need to be available only while the lights 8 are on and, perhaps, one more time when the lights go off, in order to announce that the sensor node is going to sleep while the lights are out. The sensor node wakes up after going to sleep while the lights 8 are out based on a timer interrupt (not shown) of the microprocessor 16 or a manual switch input (not shown) or a state change of a sensor input (not shown).

EXAMPLE 6

As a more specific example for Example 5, the sensor node is a photo sensor that informs a lighting controller (not shown) of the amount of light on a work surface (not shown). In turn, the lighting controller uses that information to brighten or dim, as appropriate, the current light intensity setting, in order to provide a relatively constant light intensity over the life of the light bulbs or to adjust the light intensity if natural light is available for part of the day.

EXAMPLE 7

In a "night operation" model, the wireless nodes 10,10' are sensor nodes that are suitably sized to store ample charge over a relatively long period of time while the lights 8 are on (e.g., a suitable time; during the daytime at a residence or business or school; a 12 hour period), in order that the sensor node can operate (e.g., trickle charge from the corresponding supercap 12,38) during the time that the lights 8 are off (e.g., a suitable time; during the nighttime; a subsequent 12 hour period). In some instances, one or perhaps more wireless messages 18 during the nighttime may be permitted. Here, the sensor node knows, monitors and/or calculates QR+QI, and then manages the count (N) of one or more wireless messages 18 during the time that the lights are off (e.g., the nighttime), such that QQ+NΔQT does not exceed the charge that was harvested during the time that the lights 8 were on (e.g., the daytime). Alternatively, the wireless nodes 10,10' may be employed in other applications, such as, for example, a business where the lights are on during the daytime and are off during the nighttime.

EXAMPLE 8

Even during times of sleep or no transmission by the radio unit 14, there is some relatively small finite current draw on the supercap 12, that, of course, increases when there is a transmission of one of the wireless messages 18. QQ may be the average quiescent charge removed during the active transmit time (T2) when there is no light and, thus, no charging. Although the quiescent charge being removed may fluctuate over time (e.g., the microprocessor 16 is sleeping but its timer (not shown) is running; the microprocessor 16 is awake and reading its sensor input (not shown); the microprocessor 16 is awake and is deciding if it should transmit), QQ is a relatively low charge compared to the transmit charge removed during the active transmit time.

EXAMPLE 9

The general charge and discharge operation of the wireless nodes 10,10' employing the respective photocells 2,4 is as follows. During the course of a day, the photocells 2,4 convert ambient light into an electrical charge, in order to replenish the power supply of the respective wireless nodes 10,10' (e.g., without limitation, a wall switch sensor; a motion (occupancy) sensor). If $E_C$ is the charging energy and $E_D$ is the sum of the discharging energy of all discharging events (e.g., supercap self discharge; switch-to-fixture radio transmission; motion sensor activity), then $E_C > E_D$. By meeting this criteria, the power supply has adequate residual energy available to initiate a "lights-on" command the following morning.

EXAMPLE 10

The wireless node 10 of FIG. 1 may be a wall switch node. In the event that the power supply of the wall switch node gets relatively very low on stored charge, then it may turn the lights 8 on in order to replenish itself. The operation of the lights 8 for this purpose is monetarily less expensive and gentler on the environment than replacing non-rechargeable batteries (not shown). Hence, the microprocessor 16 may determine that the charge 20 of the supercap 12 is below a suitable predetermined value (e.g., without limitation, about 1.8 VDC), and responsively transmit a wireless message 18A to another wireless node (not shown) to turn on a light, such as 8, in order to provide ambient light to charge the supercap 12. Later, the microprocessor 16 may determine that the charge 20 of the supercap 12 is above another, greater suitable predetermined value (e.g., without limitation, about 2.3 VDC), and responsively transmit another wireless message 18B to the other wireless node to turn off the light.

EXAMPLE 11

Figure 3:
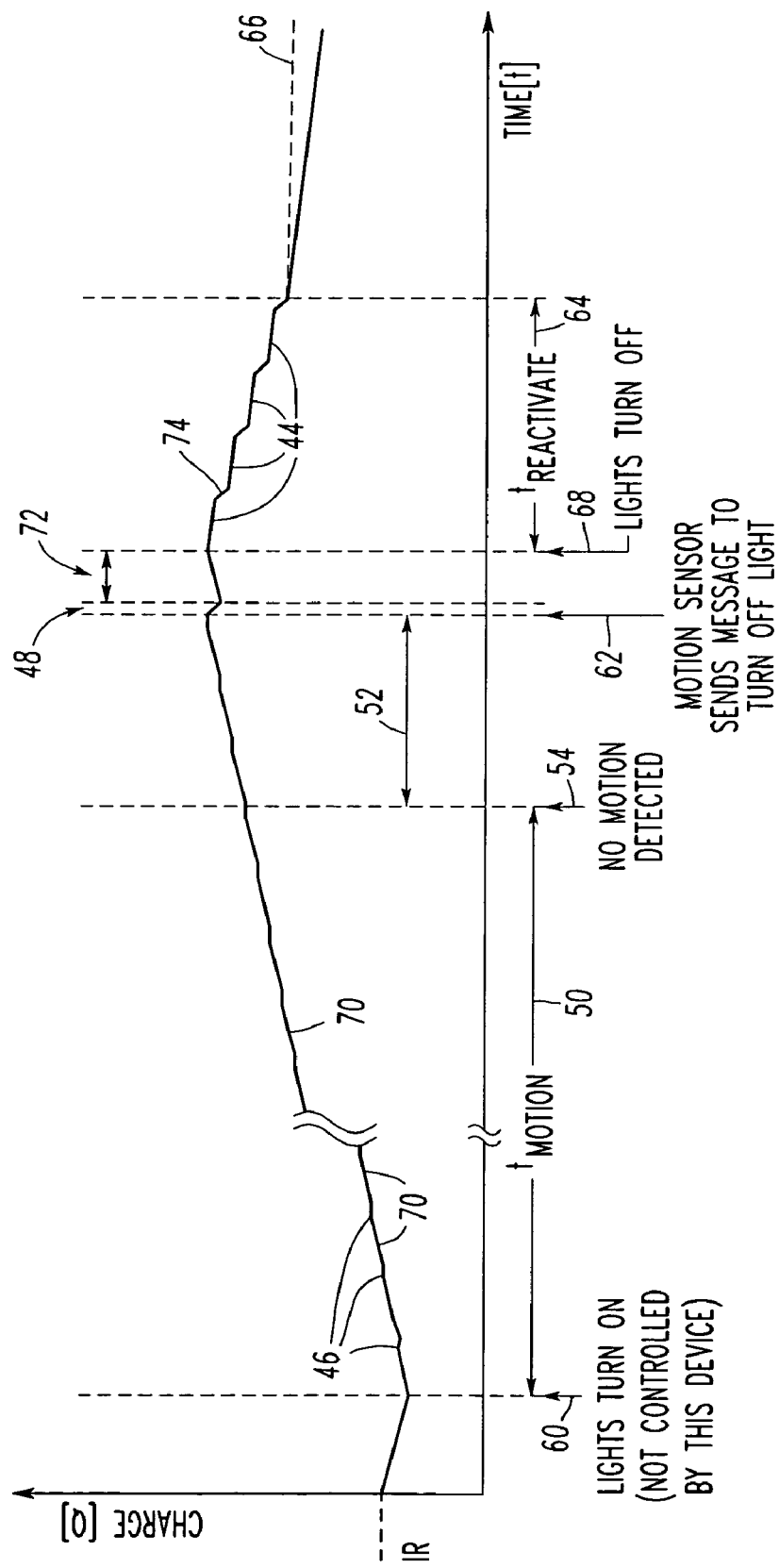
FIG. 3 is a plot of power supply charge versus time for a motion sensor node in accordance with another embodiment of the invention.

The wireless node 10 of FIG. 1 may be a motion sensor node. As shown in FIG. 3, the electricity consumed by the motion sensor node is a function of leakage or quiescent discharge (without sensing motion) 44, system sleep-mode current consumption (not shown), periodic occupancy-scan events (during charging) 46 and transmission events, such as 48, of the wireless messages 18 (FIG. 1) sent to switch on/off the corresponding light fixture. The wireless messages 18 are not sent when the lights 8 are on and the motion sensor node detects motion during time 50 (or for a predetermined time 52 (e.g., without limitation, about 30 minutes) after no motion is detected at 54).

EXAMPLE 12

Figure 4:
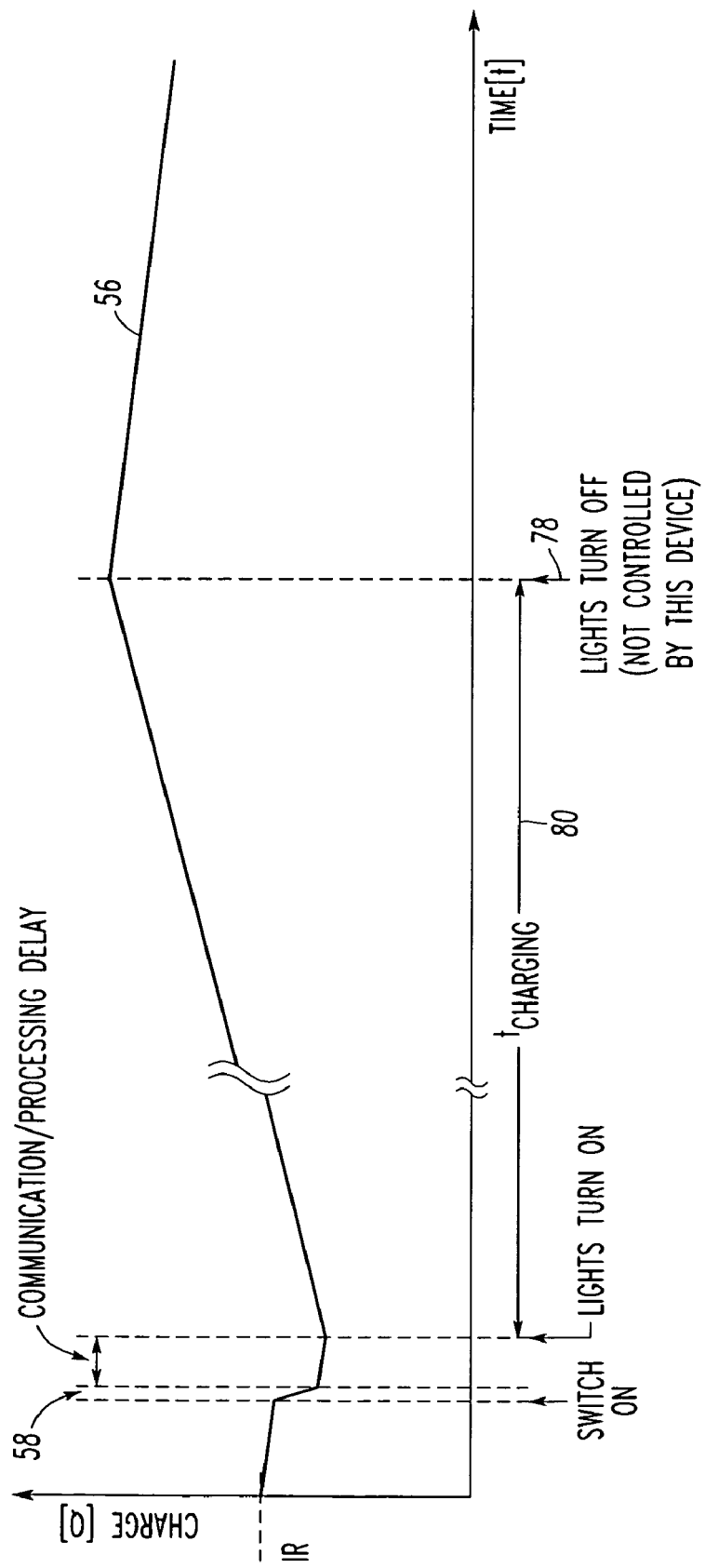
FIG. 4 is a plot of power supply charge versus time for a light switch node in accordance with another embodiment of the invention.

The wireless node 10 of FIG. 1 may be a wall switch node. The electricity consumed by the wall switch node, as shown in FIG. 4, is limited to leakage or quiescent discharge 56, system sleep-mode current consumption (not shown) and transmission events, such as 58, of the wireless messages 18 (FIG. 1) sent to "manually" switch on/off the corresponding lights 8 (FIG. 1).

EXAMPLE 13

In this example, as might be found in a relatively large office space or hallway, there is a relatively long on-time followed by either a relatively long or short off-time. FIG. 3 shows a plot of power supply charge (Q) versus time (t) for a motion sensor (occupancy detector) node. For example, at the start of a typical work day, a time of day clock automatically (or the first person into the area manually) initiates the "lights-on" command 60 (e.g., to turn on the lights in the usual way). A data packet is wirelessly sent from the wall switch node (FIG. 4) to a light fixture node (not shown), which powers the lights 8. The motion sensor node (FIG. 3) periodically scans for zone activity while the lights are on and switches off the lights in its zone, at 62, when no motion is detected after a first predetermined time 52. The motion sensor node remains in its motion-detecting mode for a second predetermined time 64 after the lights are switched off. During this time, its radio unit 14 (FIG. 1) transmits a power-on signal (not shown) to the light fixture device if motion is detected. If the second predetermined time 64 elapses without detecting motion, then the motion sensor node enters a low-current hibernation mode 66 until the next manual "lights-on" command, such as 60. Preferably, the charge consumed by the low-current hibernation mode 66 is less than the charge consumed by the quiescent discharge (without sensing motion) 44.

FIG. 3 shows that there is a limit on the amount of time ($T_{REACTIVATE}$) 64 that the light powered motion sensor node can operate after the lights 8 (FIG. 1) are off. Thus, for a motion sensor node, the lights 8 may be on for a fixed time 52 (e.g., without limitation, about 30 minutes) after motion is no longer detected. Here, for example, the motion sensor node would likely need to be available only while the lights 8 are on and, perhaps, one more time when the lights go off, at 68, to announce that it is going to sleep. The time 64 ($T_{REACTIVATE}$) or a suitable fixed time to allow a person to turn on lights through motion, shows that the motion sensor node only needs to remain powered for a "reasonable" period of time after the lights 8 go out. In other words, if the lights go out and the motion sensor node does not detect someone within an amount of time 64 (e.g., 30 minutes), then that person is probably not there or is not coming back. Hence, no one would care if the motion sensor node runs out of power and cannot operate.

Preferably, the second predetermined time 64 is selected as a function of the then current charge 20 of the supercap 12 (FIG. 1). For example, the time 64 may be relatively longer for a corresponding relatively greater charge on the supercap 12 (e.g., due to the ambient light being on for relatively longer periods of time).

FIG. 3 also shows the time 50 during which the motion sensor node detects motion including times 70 of charging with sensing motion, a time 72 for communication and/or processing delay before the lights turn off at 68, and quiescent discharging with sensing motion 74.

EXAMPLE 14

In this example, as might be found in bathrooms, closets or other storage areas, there is a relatively short on-time, and a relatively long off-time. FIG. 4 shows a plot of power supply charge versus time for the wall switch node. Similar to Example 13, an occupant manually turns the lighting on in a given zone, at 76. With reduced traffic in this zone, the lighting extinguishes, at 78, after a period of charging time 80. There is less time for the recharging circuit to convert available light into electricity. Hence, the size of the photocell 2 (FIG. 1) is suitably scaled to preserve enough charge in the supercap 12 (FIG. 1) of the wall switch node for sustained, maintenance-free performance. The wall switch node also has the ability to determine the state of charge of the supercap 12 (FIG. 1) in order that it can make a decision to turn on the lights periodically (e.g., without limitation, once or more per day) to provide a recharge when required.

Although the wireless nodes 10,10' of FIGS. 1-2 employ a microprocessor 16, it will be appreciated that a combination of one or more of analog, digital and/or processor-based circuits may be employed.

EXAMPLE 15

Figure 5:
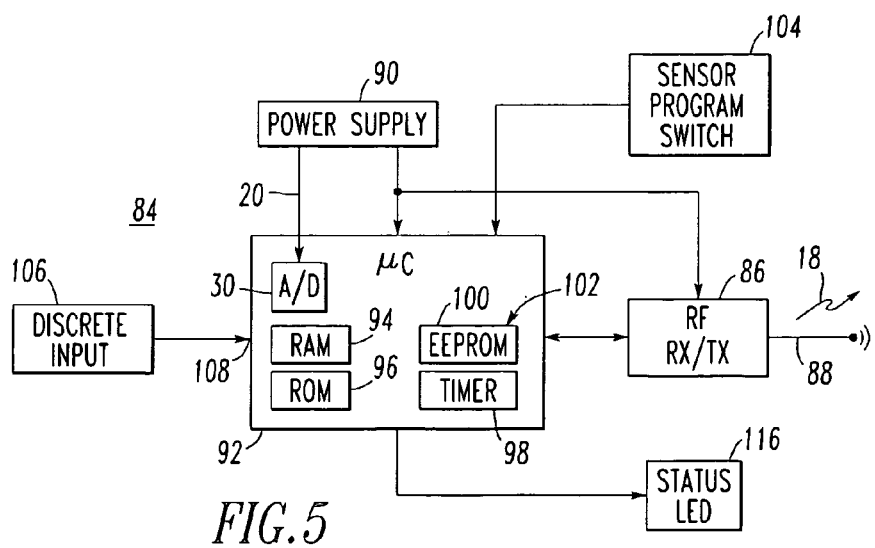
FIG. 5 is a block diagram of a wireless sensor node in accordance with another embodiment of the invention.

FIG. 5 shows a wireless sensor node 84, such as an on/off digital (discrete) sensor. The wireless sensor node 84 includes an RF transceiver (RF RX/TX) 86 having an external antenna 88, a power supply circuit 90 for powering the various sensor components, a suitable processor, such as a microcontroller (μC) 92 having RAM 94, ROM 96, a timer 98 (e.g., in order to provide, for example, a periodic wake-up of the μC 92, in order to periodically send sensor status information back to a base station (not shown)) and other memory (e.g., EEPROM 100 including the unique ID 102 of the component which is stored therein during manufacturing), and a sensor program switch 104 for mating with a program switch (not shown) of a portable device (not shown). The on/off digital (discrete) sensor includes a physical discrete input interface 106 (e.g., an on/off detector; a wall switch; a motion detector) with the μC 92 employing a discrete input 108.

The wireless sensor node 84 includes a suitable indicator, such as an LED 116, to output the status of the physical discrete input interface 106 (e.g., LED illuminated for on; LED non-illuminated for off) or to show that the power supply 90 is OK. It will be appreciated, however, that the wireless sensor node 84 need not employ an indicator.

The power supply 90 advantageously includes the circuit 42 of FIG. 1 (or the circuit 40 of FIG. 2) and the power supply 24 of FIG. 1.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of powering a wireless node, said wireless node being adapted to transmit wireless messages, said method comprising:
   employing an energy store including a charge;
   charging said energy store responsive to ambient light;
   determining an incremental charge of said energy store resulting from said ambient light;
   employing a charge removed from said energy store to transmit one of said wireless messages;
   determining the charge of said energy store; and
   adjusting a count of at least one of said wireless messages to be transmitted or a transmission rate of said wireless messages as a function of said incremental charge of said energy store, the charge of said energy store and said charge removed.

2. The method of claim 1 further comprising
   determining said incremental charge added to said energy store during said charging;
   determining quiescent charge removed from said energy store;
   determining charge available for transmitting at least one of said wireless messages by said wireless node from said incremental charge plus the charge of said energy store less said quiescent charge;
   employing a predetermined charge removed as said charge removed;

employing said charge available being greater than said predetermined charge removed as said function to determine a count of one wireless message as said count of at least one of said wireless messages to be transmitted; and transmitting said one wireless message.

3. The method of claim 1 further comprising employing a sensor node as said wireless node;

employing two wireless messages as said at least one of said wireless messages; and employing a second one of said two wireless messages to indicate that said sensor node is going to sleep.

4. The method of claim 1 further comprising employing a motion sensor node as said wireless node;

periodically sensing motion responsive to said ambient light;

transmitting one of said wireless messages to another wireless node to switch a light off responsive to no motion being detected after a first predetermined time;

continuing to periodically sense motion for a second predetermined time after said light is switched off; and transmitting one of said wireless messages to said another wireless node to switch said light on responsive to motion being detected, and otherwise, sleeping and waking up responsive to said ambient light.

5. The method of claim 4 further comprising selecting said second predetermined time as a function of said charge of said energy store.

6. The method of claim 1 further comprising employing a supercap including a voltage and a capacitance as said energy store;

determining the charge of said supercap from the product of said voltage and said capacitance; and determining the incremental charge of said supercap from a current sensor or from said capacitance times a change of said voltage over a predetermined time.

7. A wireless node comprising:

an energy store including a charge;

at least one photocell adapted to charge said energy store responsive to ambient light;

a wireless transmitter;

a processor cooperating with said wireless transmitter to transmit a count of at least one wireless message, said processor being adapted to determine the charge of said energy store, determine an incremental charge of said energy store resulting from said ambient light, and adjust said count of at least one wireless message as a function of said charge of said energy store and said incremental charge; and a power supply adapted to power said processor and said wireless transmitter from the charge of said energy store.

8. The wireless node of claim 7 wherein said power supply comprises a boost regulator and a filter capacitor.

9. The wireless node of claim 7 wherein said wireless node is a sensor node.

10. The wireless node of claim 9 wherein said sensor node is a photo sensor adapted to inform a lighting controller of an amount of light on a work surface.

11. The wireless node of claim 9 wherein said sensor node is a light switch.

12. The wireless node of claim 9 wherein said sensor node is a motion sensor.

13. A wireless node comprising:

an energy store including a charge;

at least one photocell adapted to source a current responsive to ambient light;

a current to voltage converter adapted to charge said energy store responsive to said current;

a wireless transmitter;

a processor cooperating with said wireless transmitter to transmit a count of at least one wireless message, said processor being adapted to determine the charge of said energy store, determine an incremental charge of said energy store resulting from said ambient light, and adjust said count of at least one wireless message as a function of said charge of said energy store and said incremental charge; and a power supply adapted to power said processor and said wireless transmitter from the charge of said energy store.

14. A method of powering a wireless node, said wireless node being adapted to transmit wireless messages, said method comprising:

employing an energy store including a charge;

charging said energy store responsive to ambient light;

determining an incremental charge of said energy store resulting from said ambient light;

employing a charge removed from said energy store to transmit one of said wireless messages;

determining the charge of said energy store;

adjusting a count of at least one of said wireless messages to be transmitted or a transmission rate of said wireless messages as a function of said incremental charge of said energy store, the charge of said energy store and said charge removed;

determining said incremental charge added to said energy store during said charging;

determining quiescent charge removed from said energy store;

determining charge available for transmitting at least one of said wireless messages by said wireless node from said incremental charge plus the charge of said energy store less said quiescent charge;

employing a predetermined charge removed as said charge removed; and employing said charge available divided by said predetermined charge removed as said function to determine said count of at least one of said wireless messages to be transmitted over a predetermined time.

15. The method of claim 14 further comprising establishing an inactive charge time during daytime hours and an active transmit time during nighttime hours.

16. The method of claim 15 further comprising employing a sensor node as said wireless node; and transmitting said count of at least one of said wireless messages during said nighttime hours.

17. A method of powering a wireless node, said wireless node being adapted to transmit wireless messages, said method comprising:

employing an energy store including a charge;

charging said energy store responsive to ambient light;

determining an incremental charge of said energy store resulting from said ambient light;

employing a charge removed from said energy store to transmit one of said wireless messages;

determining the charge of said energy store;

adjusting a count of at least one of said wireless messages to be transmitted or a transmission rate of said wireless messages as a function of said incremental charge of said energy store, the charge of said energy store and said charge removed;

determining that the charge of said energy store is below a predetermined value; and transmitting one of said wireless messages to another wireless node to turn on a light, in order to provide ambient light to charge said energy store.

18. The method of claim 17 further comprising
employing a first predetermined value as said predetermined value;
determining that the charge of said energy store is above a second predetermined value; and
transmitting one of said wireless messages to said another wireless node to turn off said light.

19. A method of powering a wireless node, said wireless node being adapted to transmit wireless messages, said method comprising:
employing an energy store including a charge;
charging said energy store responsive to ambient light;
determining an incremental charge of said energy store resulting from said ambient light;
employing a charge removed from said energy store to transmit one of said wireless messages;
determining the charge of said energy store;
adjusting a count of at least one of said wireless messages to be transmitted or a transmission rate of said wireless messages as a function of said incremental charge of said energy store, the charge of said energy store and said charge removed;
establishing an inactive charge time and an active transmit time;
determining said incremental charge added to said energy store during the inactive charge time;
determining quiescent charge removed from said energy store during the active transmit time;
determining charge available for transmitting one of said wireless messages from said incremental charge plus the charge of said energy store less said quiescent charge;
employing a predetermined charge removed as said charge removed during the active transmit time for transmitting one of said wireless messages; and
employing said charge available divided by said predetermined charge removed as said function to adjust said count of at least one of said wireless messages to be transmitted or said transmission rate of said wireless messages.

20. The method of claim 19 further comprising
employing a sum of said inactive charge time and said active transmit time of about 24 hours.

21. The method of claim 19 further comprising
employing as said quiescent charge an average quiescent charge removed during the active transmit time.

* * * * *